(12) United States Patent  
Kobayashi

(10) Patent No.: US 8,490,742 B2  
(45) Date of Patent: Jul. 23, 2013

(54) HYDRAULIC POWER STEERING UNIT

(75) Inventor: Yukihiro Kobayashi, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 636 days.

(21) Appl. No.: 11/412,937

(22) Filed: Apr. 28, 2006

(65) Prior Publication Data

US 2006/0243518 A1    Nov. 2, 2006

(30) Foreign Application Priority Data

Apr. 28, 2005   (JP) ................................. 2005-131622

(51) Int. Cl.
 *B62D 5/06* (2006.01)
 *B62D 5/065* (2006.01)
(52) U.S. Cl.
 CPC .................................. *B62D 5/065* (2013.01)
 USPC ........................... 180/422; 180/441; 180/442
(58) Field of Classification Search
 USPC .................................. 180/421–423, 441, 442
 See application file for complete search history.

(56) References Cited

U.S. PATENT DOCUMENTS

| 4,043,419 | A | * | 8/1977 | Larson et al. | 180/402 |
|---|---|---|---|---|---|
| 4,457,390 | A | | 7/1984 | Abe et al. | |
| 4,566,477 | A | * | 1/1986 | Barker et al. | 137/101 |
| 4,593,358 | A | * | 6/1986 | Takeshima et al. | 701/41 |
| 4,626,994 | A | * | 12/1986 | Yabe et al. | 701/41 |
| 4,644,748 | A | | 2/1987 | Goss, Jr. et al. | |
| 4,714,413 | A | * | 12/1987 | Duffy | 417/293 |
| 4,838,765 | A | * | 6/1989 | Wusthof et al. | 417/203 |
| 4,913,250 | A | * | 4/1990 | Emori et al. | 180/422 |
| 4,949,541 | A | * | 8/1990 | de Vietro | 60/413 |
| 4,971,173 | A | * | 11/1990 | Takahashi | 180/412 |
| 5,048,628 | A | * | 9/1991 | Rayner | 180/421 |
| 5,184,693 | A | * | 2/1993 | Miller | 180/423 |
| 5,224,564 | A | * | 7/1993 | Duffy | 180/422 |
| 5,267,628 | A | * | 12/1993 | Tomiyoshi et al. | 180/420 |

(Continued)

FOREIGN PATENT DOCUMENTS

| DE | 197 33 096 A1 | 2/1999 |
|---|---|---|
| EP | 0 940 317 A2 | 9/1999 |

(Continued)

OTHER PUBLICATIONS

Pre-Appeal Reexamination Report issued Dec. 20, 2011 in Japanese Application No. 2005-131622 filed Apr. 28, 2005 (with English Translation).

(Continued)

*Primary Examiner* — Joseph Rocca
*Assistant Examiner* — Maurice Williams
(74) *Attorney, Agent, or Firm* — Oblon, Spivak, McClelland, Maier & Neustadt, L.L.P.

(57) ABSTRACT

A hydraulic power steering unit has an assist force generating unit that uses oil to generate assist force for steering by a steering device, a variable flow oil pump unit that supplies oil to the assist force generating unit, and a controller that controls the oil pump unit. The controller has a command flow setting device that sets a command flow rate Qc of the oil supplied from the oil pump unit to the assist force generating unit in accordance with a vehicle quantity of state such as a vehicle speed, steering angle or the like. The controller also has a flow correcting device that corrects the command flow rate Qc in accordance with the speed of the oil pump unit.

7 Claims, 4 Drawing Sheets

U.S. PATENT DOCUMENTS

| | | | |
|---|---|---|---|
| 5,439,070 A | | 8/1995 | Haga et al. |
| 5,467,281 A | | 11/1995 | Iwashita et al. |
| 5,471,838 A | * | 12/1995 | Suzuki et al. .................. 60/468 |
| 5,515,938 A | * | 5/1996 | Haga et al. .................. 180/417 |
| 5,564,516 A | * | 10/1996 | Nimblett et al. ............. 180/423 |
| 5,577,573 A | * | 11/1996 | Haga et al. .................. 180/417 |
| 5,651,423 A | * | 7/1997 | Haga et al. .................. 180/403 |
| 5,762,159 A | * | 6/1998 | Matsuoka et al. ............. 180/422 |
| 5,786,674 A | * | 7/1998 | Kress et al. .................. 318/268 |
| 5,904,222 A | * | 5/1999 | Liubakka et al. ............. 180/422 |
| 5,936,379 A | * | 8/1999 | Matsuoka ..................... 318/810 |
| 5,946,911 A | * | 9/1999 | Buschur et al. ................ 60/424 |
| 6,062,332 A | * | 5/2000 | Stephenson et al. .......... 180/305 |
| 6,101,435 A | * | 8/2000 | Baughn et al. .................. 701/41 |
| 6,195,601 B1 | * | 2/2001 | Spillner et al. .................. 701/41 |
| 6,366,842 B1 | * | 4/2002 | Kaji et al. ....................... 701/41 |
| 2003/0144782 A1 | * | 7/2003 | Shimizu et al. ................. 701/41 |
| 2004/0194459 A1 | | 10/2004 | Namuduri |
| 2004/0226769 A1 | * | 11/2004 | Croughs et al. .............. 180/422 |
| 2005/0178607 A1 | * | 8/2005 | Kodama et al. ............... 180/422 |

FOREIGN PATENT DOCUMENTS

| | | |
|---|---|---|
| EP | 0 958 990 A2 | 11/1999 |
| EP | 1 413 497 A1 | 4/2004 |
| JP | 59-137868 | 9/1984 |
| JP | 03-231073 | 10/1991 |
| JP | 5-345573 | 12/1993 |
| JP | 8-244638 | 9/1996 |
| JP | 11-334630 | 12/1999 |
| JP | 2001-163233 | 6/2001 |
| WO | WO 96/26098 | 8/1996 |

OTHER PUBLICATIONS

Partial Translation of Notification of Reason(s) for Refusal issued Mar. 15, 2012 in Japanese Application No. 2005-131622 filed Apr. 28, 2005 (with English Translation).

* cited by examiner

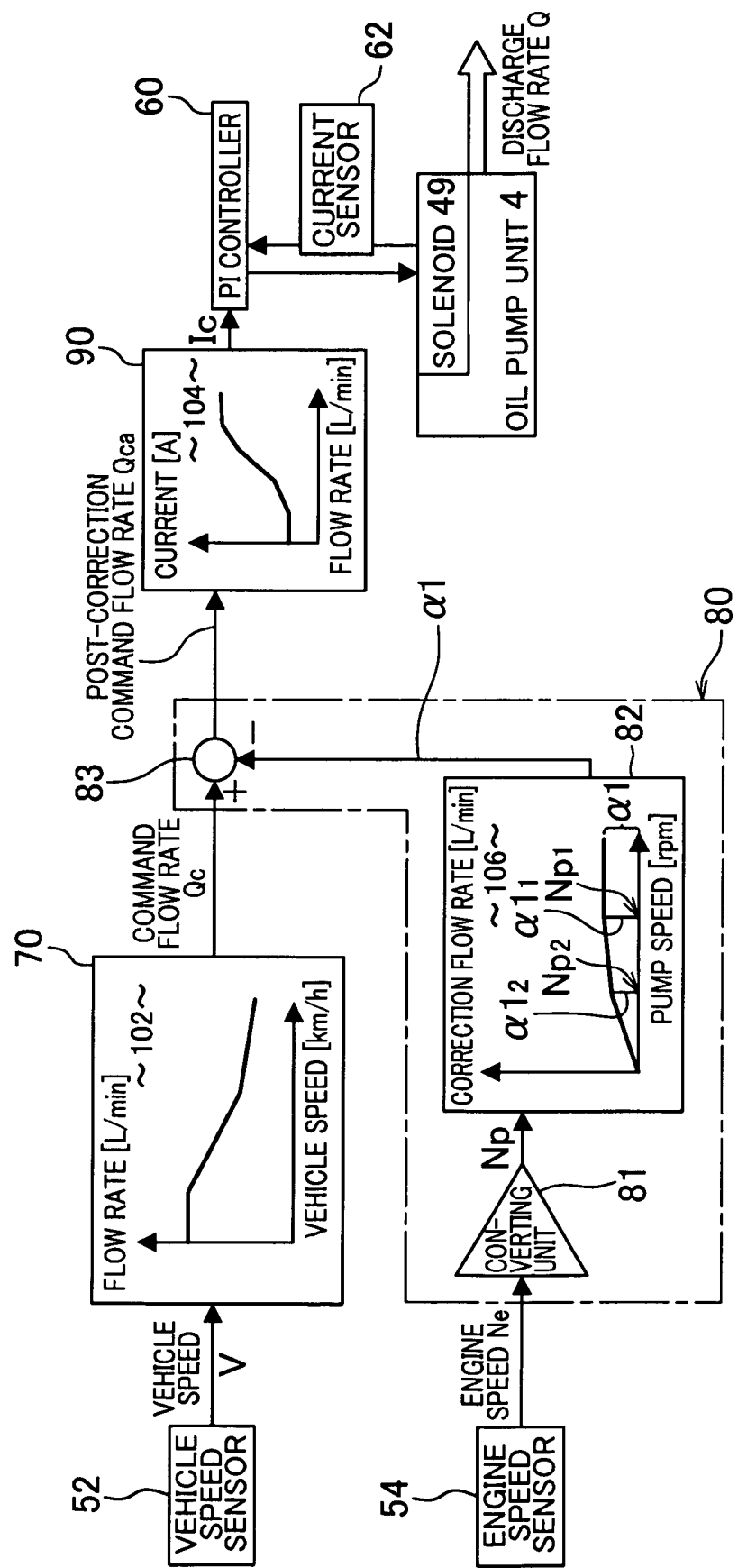

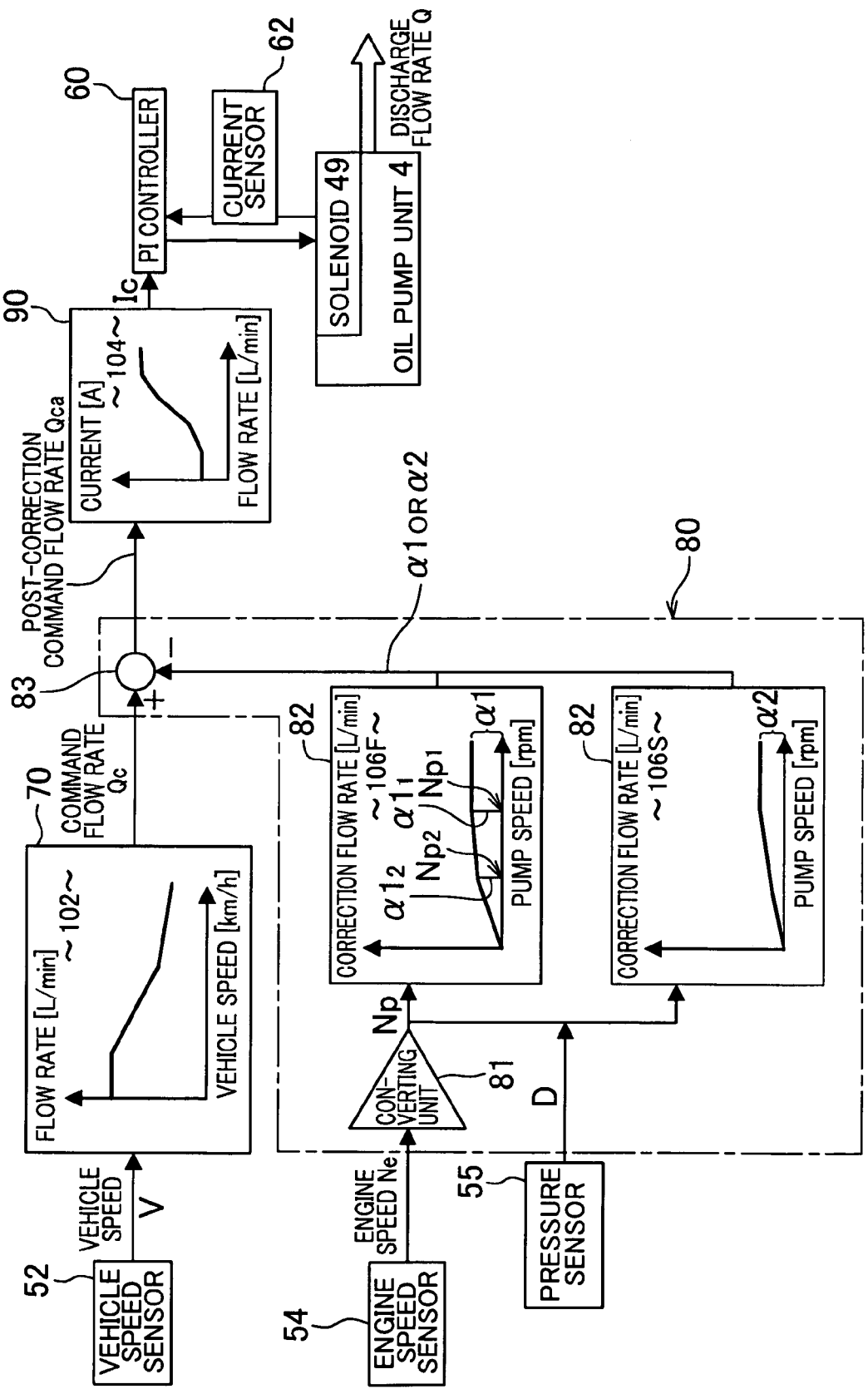

HYDRAULIC POWER STEERING UNIT

INCORPORATION BY REFERENCE

This invention is based on and claims priority under 35 U.S.C. 119 with respect to Japanese Patent Application No. 2005-131622, filed on Apr. 28, 2005, entire contents of that Application are incorporated herein by reference.

BACKGROUND OF THE INVENTION

1. Field of the Invention

The present invention relates to a hydraulic power steering unit that assists steering.

2. Description of the Related Art

Japanese Patent Application Publication JP-A-2001-163233 describes a hydraulic power steering unit in which an oil pump includes a discharge port that has a control valve. The oil pump supplies a flow of oil for assisting steering from the control valve to a power cylinder in accordance with various signals for the steering angle, steering speed and vehicle speed during steering, whereby the hydraulic power steering unit generates assist force for assisting steering.

According to the above unit, oil is supplied to an assist force generating unit to allow the assist force to be generated in conjunction with steering, thereby assisting the driver's steering. However, a flow rate of oil discharged from the oil pump per unit time tends to change in response to changes in speed (rotational speed) of the oil pump. Therefore, if the oil pump speed changes, even if the steering conditions, i.e. vehicle speed and steering angle, are the same, the assist force may subtly differ before and after the change of the pump speed. This may cause a subtle difference in steering feel which the driver or other vehicle users can sense. In particular, when a transmission shifts gear, the pump speed easily changes due to change in the engine speed before and after the shifting. As a result, the flow rate of oil discharged from the oil pump per unit time tends to change. Accordingly, assist force may subtly differ before and after shifting, causing a difference in steering feel which the driver or other vehicle users can sense.

SUMMARY OF THE INVENTION

The present invention has been accomplished in view of the foregoing problems. It is an object of the present invention to provide a hydraulic power steering unit that is advantageous for reducing differences in steering feel that the driver or other vehicle users can sense, even when the speed of the oil pump unit changes.

A hydraulic power steering device according to the present invention includes: an assist force generating unit that uses oil to generate assist force for steering by a steering unit; a oil pump unit which supplies oil to the assist force generating unit; and a control unit that controls the oil pump unit. In the hydraulic power steering unit, the control unit includes a command flow setting device and a flow correcting device. The command flow setting device sets a command flow rate of the oil supplied from the oil pump unit to the assist force generating unit in accordance with a vehicle quantity of state, such as a vehicle speed, a steering angle or the like. The flow correcting device corrects the command flow rate of the oil set by the command flow setting device in accordance with the speed of the oil pump unit.

BRIEF DESCRIPTION OF THE DRAWINGS

FIG. 3 is a block diagram showing a control unit of the power steering unit; and FIG. 4 is a block diagram showing a control unit of a power steering unit according to a second embodiment.

DETAILED DESCRIPTION OF THE PREFERRED EMBODIMENTS

First Embodiment

Figure 1:
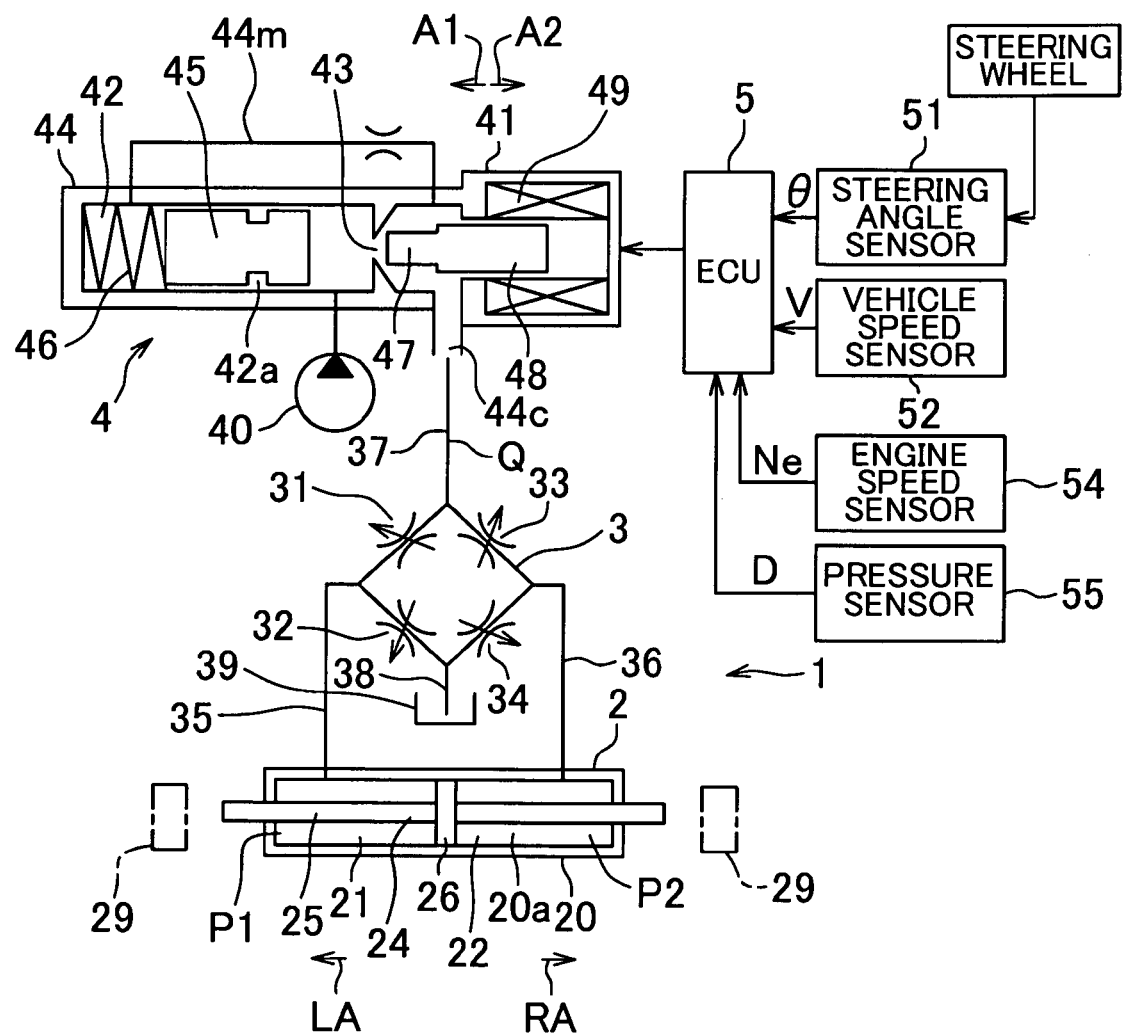
FIG. 1 is a block diagram schematically showing a power steering unit.
Figure 2:
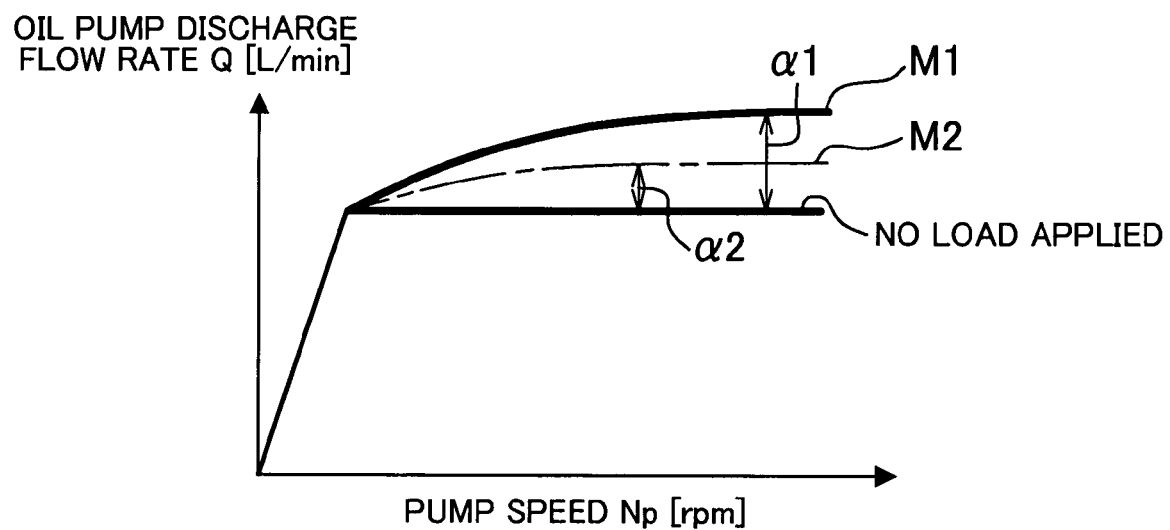
FIG. 2 is a graph showing the relationship between a rotational speed and a flow rate of an oil pump.

Hereinafter, a first embodiment of the present invention will be described in detail with reference to FIGS. 1 to 3. As shown in FIG. 1, a power steering unit has an assist force generating unit 1 and a variable flow oil pump unit 4. The assist force generating unit 1 generates force for assisting steering by a steering wheel, which serves as a steering device capable of steering the vehicle. The oil pump unit 4 supplies oil that actuates the assist force generating unit 1.

The oil pump unit 4 includes an oil pump 40 and a control valve 41. The oil pump 40 serves as a feed source for moving oil. The control valve 41 is disposed between the oil pump 40 and the assist force generating unit 1, and controls the flow rate of oil supplied from the oil pump 40 to the assist force generating unit 1. The oil pump 40 is connected to an engine (not shown) that serves as a drive source for running the vehicle. Rotation of the engine is transmitted to the oil pump 40 via a pulley (not shown). Hence, the speed (rotational speed) of the oil pump 40 is basically proportional to the speed of the engine.

The control valve 41 includes a body 44, a spool 45, a spring 46, a moveable portion 48, and a solenoid 49. The body 44 has a working chamber 42 and a variable orifice 43. The spool 45 is moveably accommodated in a spool chamber 42a of the working chamber 42 of the body 44. The spring 46 serves as an urging device that urges the spool 45 toward the variable orifice 43. The moveable portion 48 has a valve portion 47 facing the variable orifice 43. The solenoid 49 serves as a drive unit that moves the moveable portion 48. The control valve 41 also includes a return path 44m that introduce oil at the variable orifice 43 side to the back end side of the spool 45.

A steering angle sensor 51 directly or indirectly detects a steering angle θ of the steering wheel, and functions as a steering angle detection device. A vehicle speed sensor 52 directly or indirectly detects a speed V of the vehicle, and functions as a vehicle speed detecting device or a vehicle quantity of state detecting device. An engine speed sensor 54 directly or indirectly detects an engine speed Ne of the vehicle, and functions as an engine speed detecting device. A pressure sensor 55 detects a pressure D of the pressure discharged from the control valve 41, and functions as a load detecting device that detects the load applied to the oil pump 40. Signals for the steering angle θ from the steering angle sensor 51, the vehicle speed V from the vehicle speed sensor 52, the engine speed Ne from the engine speed sensor 54, the pressure D from the pressure sensor 55 and the like are input to a control unit (controller) 5.

The control unit 5 controls exciting current supplied to the solenoid 49, based on the steering angle θ, the vehicle speed V, the engine speed Ne and the like. This operation moves the moveable portion 48 in the directions of arrows A1 and A2, thereby regulating the opening area of the variable orifice 43. As a result, the variable orifice 43 functions as an opening with a variable opening area. When the opening area of the variable orifice 43 is changed, a flow rate Q of the oil supplied from a discharge port 44c of the control valve 41 to the assist force generating unit 1 changes. Note that the control unit 5 can detect steering of the steering wheel based on increase or decrease in an absolute value of the steering angle per unit time, which is obtained from the signal reflecting the steering angle θ.

The assist force generating unit 1 includes a power cylinder 2 and a steering valve 3. The power cylinder 2 has a cylinder body 20 including a hollow chamber 20a, and a moveable body 24. The moveable body 24 is moveably disposed in the hollow chamber 20a and divides the hollow chamber 20a into a first chamber 21 and a second chamber 22. The moveable body 24 has a rod 25 that can move in an axial direction and a piston 26 that is integrally provided with the rod 25. Wheels 29 are attached to opposite ends of the rod 25 via joints (not shown). Differential pressure between the first chamber 21 and the second chamber 22 moves the rod 25 in the direction of either arrow LA or RA. This movement functions to provide assist force for the steering of the wheels 29.

The steering valve 3 functions as a feed path switching device that switches the paths along which oil is fed to the first chamber 21 and the second chamber 22 of the power cylinder 2. The steering valve 3 is actuated in conjunction with operation of the steering wheel. The steering valve 3 has a first variable throttle 31 and a second variable throttle 32 that are connected in series and has a third variable throttle 33 and a fourth variable throttle 34 that are also connected in series. A main path 37 provided between the first variable throttle 31 and the third variable throttle 33 is connected to the discharge port 44c of the control valve 41. Opening degrees of the first to fourth variable throttles 31 to 34 are changed along with operation of the steering wheel.

A first path 35 provided between the first variable throttle 31 and the second variable throttle 32 is connected to the first chamber 21 of the power cylinder 2. A second path 36 provided between the third variable throttle 33 and the fourth variable throttle 34 is connected to the second chamber 22 of the power cylinder 2. A discharge path 38 provided between the second variable throttle 32 and the fourth variable throttle 34 is connected to a reservoir 39.

When the steering wheel is in a neutral position, the opening degrees of the first to fourth variable throttles 31 to 34 are held at substantially the same degree. Oil supplied from the discharge port 44c of the control valve 41 via the main path 37 is fed to the reservoir 39 via the discharge path 38. When the steering wheel is turned in one direction, the opening degrees of the first variable throttle 31 and the fourth variable throttle 34 increase, and the opening degrees of the second variable throttle 32 and the third variable throttle 33 decrease. As a result, oil supplied from the discharge port 44c of the control valve 41 is fed to the first chamber 21 via the first variable throttle 31 and the first path 35. Accordingly, oil pressure P1 in the first chamber 21 increases, thereby moving the piston 26 and the rod 25 in one direction, namely, the direction indicated by arrow RA. At the same time, oil in the second chamber 22 is returned to the reservoir 39 via the second path 36 and the fourth variable throttle 34.

When the steering wheel is turned in the other direction, the opening degrees of the second variable throttle 32 and the third variable throttle 33 increase, and the opening degrees of the first variable throttle 31 and the fourth variable throttle 34 decrease. As a result, oil supplied from the discharge port 44c of the control valve 41 is fed to the second chamber 22 of the power cylinder 2 via the third variable throttle 33 and the second path 36. Accordingly, oil pressure P2 in the second chamber 22 increases, thereby moving the piston 26 and the rod 25 in the other direction, namely, the direction indicated by arrow LA. At the same time, oil in the first chamber 21 is returned to the reservoir 39 via the first path 35 and the second variable throttle 32. Thus, the difference of the oil pressure P1 of the first chamber 21 and the oil pressure P2 of the second chamber 22 moves the piston 26 and the rod 25, thereby providing assist force for the operation of the steering wheel. Note that oil which is not discharged from the discharge port 44c of the control valve 41 is recirculated in the oil pump 40.

According to the present embodiment, when the steering wheel is in the neutral position, that is, when the steering angle θ is substantially zero, the control unit 5 outputs a command to the control valve 41. This command is for setting the flow rate Q of oil supplied from the discharge port 44c of the control valve 41 to the assist force generating unit 1 to a standby flow rate Qs that corresponds to the flow rate in the initial state. Thus, when the steering wheel is held in the neutral position, the flow rate Q is maintained at the standby flow rate Qs. Note that the standby flow rate Qs is larger than zero.

When the steering wheel is in the neutral position, the flow rate Q is maintained at the standby flow rate Qs instead of zero because feeding some oil to the assist force generating unit 1 side is beneficial for inhibiting seizure of the assist force generating unit 1. Further, even when resistance is applied to the wheels 29, the first chamber 21 and the second chamber 22 of the power cylinder 2 contain appropriate amounts of oil, and therefore the wheels 29 can be prevented from moving unsteadily. Also, since there are appropriate amounts of oil in the first chamber 21 and the second chamber 22, the response time until the flow rate Q reaches an assist flow rate Qa can be shortened, thereby improving the response of the power steering unit.

The flow rate characteristic of the oil pump 40 is load dependent. More specifically, as shown in FIG. 2, when no load is applied to the oil pump 40, the flow rate Q of the oil discharged from the oil pump 40 remains substantially unchanged, even if a pump speed Np of the oil pump 40 is changed. However, when load M1 is applied to the oil pump 40, such as during steering or the like, the flow rate Q exhibits the tendency shown by the characteristic curve in FIG. 2. That is, the flow rate Q of oil discharged from the oil pump 40 changes depending on the pump speed Np of the oil pump 40, unlike the case in which no load in applied to the oil pump 40. As described above, the flow rate Q of the oil discharged from the oil pump 40 has a load dependent characteristic. Note that, in the present application, the term "flow rate" indicates a flow rate per unit time.

Further, the phrase "no load is applied" indicates that steering of the vehicle is not being performed. Therefore, the flow rate characteristic when no load is applied corresponds to the characteristic of the flow rate of oil discharged from the oil pump 40 in a reference state. When the load M1 is applied to the oil pump 40, the amount of flow rate change with respect to the flow rate of oil discharged from the oil pump 40 in the reference state is indicated by change amount a1. Accordingly, when the load M1 is applied to the oil pump 40, the flow rate change amount a1 indicates the difference in the flow rate with respect to the flow rate of the oil discharged from the oil pump 40 in the reference state. Note that the characteristic curve when the load M1 is applied to the oil pump 40 is set in accordance with tuning of the oil pump 40 as appropriate.

FIG. 3 is a block diagram showing a control performed by the control unit 5. As shown in FIG. 3, a command flow setting device 70 has map 102, in which the relationship between the flow rate of the oil discharged from the oil pump 40 and the vehicle speed V is set. The flow rate characteristic shown in the map 102 is specified on the assumption that no load is applied to the oil pump 40. The map 102 is stored in advance in a storage device (not shown), such as a memory or the like, included in the control unit 5.

Based on the map 102, the command flow setting device 70 obtains the flow rate of oil discharged from the oil pump 40 as a command flow rate Qc in accordance with the vehicle speed V. In the map 102, when the vehicle speed V is a relatively low speed, the command flow rate Qc is increased so as to increase assist force. As a result, assistance for steering is increased, thereby facilitating appropriate steering performance. Meanwhile, when the vehicle speed V is a medium or relatively high speed, the command flow rate Qc is decreased so as to decrease assist force, thereby facilitating appropriate steering performance.

Note that, in the following explanation, the exciting current supplied to the solenoid 49 of the control valve 41 is referred to as the "current". A current setting unit 90 has map 104 in which the relationship between the flow rate of the oil and the current is set. The map 104 is stored in advance in a storage device (not shown), such as a memory or the like, included in the control unit 5. Fundamentally, the current setting unit 90 sets the current based on the flow rate of the oil set by the command flow setting device 70.

According to the present embodiment, the control unit 5 is provided with a flow correcting device 80 that corrects the command flow rate Qc set by the command flow setting device 70. The flow correcting device 80 includes a converting unit 81, a correction flow setting unit 82 and a calculating unit 83. The converting unit 81 converts the engine speed Ne detected by the engine speed sensor 54 into the pump speed Np of the oil pump 40, based on a predetermined pulley ratio. The converting unit 81 corresponds to a pump speed detecting device. The correction flow setting unit 82 sets a correction flow rate a1. Signals for the command flow rate Qc set by the command flow setting device 70 and the correction flow rate a1 are input to the calculating unit 83 which corrects the command flow rate Qc using the correction flow rate a1.

The correction flow setting unit 82 has map 106 in which the relationship between the pump speed Np of the oil pump 40 and the correction flow rate a1 is set. The map 106 is stored in advance in a storage device (not shown), such as a memory or the like. In the map 106, the correction flow rate a1 is increased when the pump speed Np of the oil pump 40 is relatively high, and the correction flow rate a1 is decreased when the pump speed Np of the oil pump 40 is relatively low. The correction flow rate a1 in the map 106 corresponds to the difference between: the flow rate of the oil discharged from the oil pump 40 in the reference state; and the flow rate of the oil discharged from the oil pump 40 when the actual load M1 is applied thereto during steering. The correction flow rate a1 is stored as the map 106 in advance in a storage device (not shown), such as a memory or the like.

A signal reflecting the pump speed Np of the oil pump 40 is input to the correction flow setting unit 82 which sets the correction flow rate a1 in accordance with the pump speed Np of the oil pump 40, based on the map 106. The calculating unit 83 then subtracts the correction flow rate a1 from the command flow Qc so as to obtain a post-correction command flow Qca. The calculating unit 83 performs this subtraction because the flow rate of the oil discharged from the oil pump 40 when the load M1 is applied thereto is larger than that when no load is applied, as shown in FIG. 2. However, if the flow rate of the oil discharged from the oil pump 40 when the load M1 is applied thereto is smaller than that when no load is applied, the calculating unit 83 adds the correction flow rate to the discharge flow rate when no load is applied.

According to the present embodiment, if the pump speed changes from $Np_1$ to $Np_2$ due to shifting or the like when assist force is being generated, the correction flow setting unit 82 adjusts the correction flow rate from $a1_1$ to $a1_2$ in accordance with the change in the pump speed. As a result, the post-correction command flow rate Qca is set to an appropriate value which takes the change in the pump speed Np into consideration. Accordingly, the flow rate Q supplied from the discharge port 44c of the oil pump unit 4 to the assist force generating unit 1 is set to an appropriate value.

The current setting unit 90 converts the post-correction command flow rate Qca into a current and sets the current as a command current Ic. The command current Ic is supplied to the solenoid 49 of the control valve 41 via a PI controller 60. As described above, the supply of command current Ic (which is an exciting current) to the solenoid 49 moves the moveable portion 48 of the control valve 41, thereby variably controlling the opening area of the variable orifice 43. As a result, the flow rate Q of the oil supplied from the discharge port 44c to the assist force generating unit 1 via the main path 37 is controlled. Note that a current sensor 62 detects the exciting current supplied to the solenoid 49. The PI controller 60 is activated so as to eliminate the deviation between the detected current and a target current.

As described above, according to the present embodiment, the flow correcting device 80 uses the correction flow rate a1 to correct the oil command flow rate Qc set by the command flow setting device 70 in accordance with the pump speed Np of the oil pump 40. Accordingly, the post-correction command flow rate Qca is set to an appropriate value. As a result, even when the pump speed Np of the oil pump 40 changes due to shifting or the like when the steering conditions of the vehicle are the same, change in the flow rate Q of oil supplied from the oil pump 40 to the assist force generating unit 1 can be reduced. Consequently, even when the pump speed Np of the oil pump 40 changes, change in assist force before and after the change in the pump speed Np can be reduced, thereby reducing differences in steering feel that the driver or other vehicle users can sense.

Second Embodiment

FIG. 4 shows a second embodiment. This embodiment basically has the same structure and effects as the first embodiment described above. Accordingly, the description given hereinafter will focus on structural elements that are different from those in the first embodiment. According to the flow characteristic shown in FIG. 2 described above, when the load M1 is applied to the oil pump 40, the amount of flow rate change with respect to the flow of oil discharged from the oil pump 40 in the reference state is indicated by the flow rate change amount a1. On the other hand, when a load M2 (M2<M1) is applied to the oil pump 40, the amount of flow rate change with respect to the flow of oil discharged from the oil pump 40 in the reference state is indicated by flow rate change amount a2. Therefore, when the load M1 is applied to the oil pump 40, change amount a1 indicates the difference in the flow rate with respect to the flow rate of the oil discharged from the oil pump 40 in the reference state. Also, when the load M2 is applied to the oil pump 40, change amount a2 indicates the difference in the flow rate with respect to the flow rate of the oil discharged from the oil pump 40 in the reference state.

As shown in FIG. 4, the correction flow setting unit 82 has a plurality of maps 106F, 106S. In the map 106F, the relationship between the pump speed Np of the oil pump 40 and a correction flow rate a1 when the load M1 is applied to the oil pump 40 is set. In the map 106S, the relationship between the pump speed Np of the oil pump 40 and a correction flow rate a2 when the load M2 is applied to the oil pump 40 is set.

The flow correcting device 80 selects either one of the maps 106F and 106S, based on the pressure D detected by the pressure sensor 55. The pressure D corresponds to load applied to the oil pump 40 during steering. More specifically, when the pressure D is equal to or close to the load M1, the correction flow setting unit 82 selects the map 106F so as to set the correction flow rate a1 in accordance with the pump speed Np of the oil pump 40 based on the map 106F. On the other hand, when the pressure D is equal to or close to the load M2, the correction flow setting unit 82 selects the map 106S so as to set the correction flow rate a2 in accordance with the pump speed Np based on the map 106S. Then, the calculating unit 83 obtains the post-correction command flow Qca by subtracting the correction flow rate a1 or a2 from the command flow rate Qc, as in the first embodiment.

The current setting unit 90 converts the post-correction command flow rate Qca into a current and sets the current as the command current Ic. The command current Ic is supplied to the solenoid 49 of the control valve 41 via the PI controller 60. As a result, the opening area of the variable orifice 43 is variably controlled, thereby controlling the flow rate Q of oil supplied from the discharge port 44c to the assist force generating unit 1.

As described above, according to the present embodiment, the flow correcting device 80 selects either one of the correction flow rates a1 and a2 in accordance with the pressure D detected by the pressure sensor 55 which detects load applied to the oil pump 40. Therefore, the post-correction command flow rate Qca is set to a more appropriate value in accordance with load applied to the oil pump 40. As a result, even when the pump speed Np of the oil pump 40 changes due to shifting or the like when the steering conditions (vehicle speed, steering angle) of the vehicle are the same, change in the flow rate Q of the oil supplied from the oil pump 40 to the assist force generating unit 1 can be reduced. Consequently, change in assist force before and after the change in the pump speed Np is reduced, thereby reducing differences in steering feel that the driver or other vehicle users can sense. This structure is advantageous when the flow rate of oil discharged from the oil pump 40 is highly pressure dependent.

Third Embodiment

A third embodiment of the present invention basically has the same structure and effects as the first embodiment. Although figures are omitted, a description will be provided using the same reference numerals. The description given hereinafter will focus on structural elements that are different from those in the first embodiment. In the first embodiment, the correction flow setting unit 82 has the map 106 in which the relationship between the pump speed Np of the oil pump 40 and the correction flow rate a1 is set. However, in the present embodiment, the map 106 of the correction flow setting device 82 is a three-dimensional map in which the relationship between the pump speed Np of the oil pump 40, the pressure D corresponding to the load applied to the oil pump 40, and the correction flow rate a1. Therefore, the flow correcting device 80 sets the correction flow rate a1 in accordance with the pump speed Np and the pressure D. As a result, the post-correction command flow rate Qca is set to a more appropriate value, which is advantageous for reducing difference in steering feel which the driver or other vehicle users can sense. This structure is advantageous when the flow rate of the oil discharged from the oil pump 40 is highly pressure dependent as in the second embodiment.

Other Embodiments

According to the first embodiment described above, the correction flow setting unit 82 of the flow correcting device 80 obtains the correction flow rate a1 in accordance with the pump speed Np based on the map 106. However, the way in which the correction flow rate a1 is determined is not limited to this configuration, and, for example, the correction flow setting unit 82 may calculate the correction flow rate a1 using the pump speed Np. Further, according to the first embodiment, the command flow setting device 70 uses the map 102 to obtain the flow rate of the oil discharged from the oil pump 40 as the command flow rate Qc in accordance with the vehicle speed V. However, the way in which the command flow Qc is obtained is not limited to this configuration, and the command flow setting device 70 may, for example, calculate the command flow rate Qc using the vehicle speed V. Still further, according to the first embodiment, the current setting unit 90 obtains the command current Ic based on the flow rate obtained from the map 104. However, the way in which the command current Ic is obtained is not limited to this configuration, and the current setting unit 90 may, for example, calculate the command current Ic using the post-correction command flow rate Qca.

The map 106 of the correction flow setting unit 82 is set with the characteristic that the correction flow rate a1 increases when the pump speed Np of the oil pump 40 is relatively high, and the correction flow rate a1 decreases when the pump speed Np of the oil pump 40 is relatively low. However, other characteristics may be set. For example, the correction flow rate a1 may be set to decrease when the pump speed Np is relatively high, and the correction flow rate a1 may be set to increase when the pump speed Np is relatively low. It is favorable that to set as the correction flow rate the difference, or an approximate value thereof, between the flow rate of the oil discharged from the oil pump 40 in a reference state and the flow rate of the oil discharged from the oil pump 40 when load is applied, in accordance with the tuning of the oil pump 40. In this case, the term "reference state" indicates a state when no load is applied, and the phrase "flow rate of the oil discharged from the oil pump 40 when load is applied" indicates the flow rate of the oil discharged from the oil pump 40 during steering.

According to the second embodiment, the correction flow setting unit 82 has the two maps 106F, 106S that correspond to different loads applied to the oil pump 40. However, the correction flow setting unit 82 may have three or more maps that correspond to different loads applied to the oil pump 40. Note that, according to the embodiments described above, the engine rotates the oil pump 40. However, if the vehicle is equipped with a motor that acts as a drive source for running the vehicle, the motor may rotate the oil pump 40.

The power steering unit according to the embodiment includes the assist force generating unit, the variable flow oil pump unit and the control unit. The assist force generating unit uses oil to generate assist force for steering by the steering device. The oil pump unit supplies oil to the assist force generating unit so that the assist force generating unit can generate assist force. The control unit controls the oil pump unit. The steering device performs steering, and may be, for example, the steering wheel located in the vicinity of the driver's seat or the like.

The assist force generating unit uses oil to generate assist force for steering by the steering unit. The assist force generating unit may be configured from, for example, the cylinder and the moveable body. The cylinder includes the hollow chamber. The moveable body is moveably disposed in the hollow chamber and divides the hollow chamber into the first chamber and the second chamber. Differential pressure between the first chamber and the second chamber moves the moveable body so that the assist force generating unit can generate assist force.

The oil pump unit may be configured from, for example, the oil pump that moves oil and the control valve. The control valve is disposed between the oil pump and the assist force generating unit, and controls the flow rate of the oil supplied from the oil pump to the assist force generating unit.

The control unit includes the command flow setting device and the flow correcting device. The command flow setting device sets the command flow rate of oil supplied from the oil pump unit to the assist force generating unit in accordance with the vehicle quantity of state, such as the vehicle speed, the steering angle or the like. The flow correcting device corrects the command flow rate in accordance with the speed of the oil pump unit. Therefore, the flow correcting device favorably has the pump speed detecting device that detects the speed of the oil pump unit, and corrects the command flow rate in accordance with the pump speed detected by the pump speed detecting device. The pump speed detecting device may directly detect the speed of the oil pump unit or may indirectly detect the speed based on the physical quantity (such as the vehicle speed, the engine speed, the crankshaft speed or the like) that has the relationship with the pump speed. Therefore, the pump speed detecting device may be configured, for example, to obtain the speed of the oil pump unit based on the speed of the drive source for running the vehicle, such as the engine or the motor.

The flow correcting device may be, for example, the calculating unit that adds or subtracts the correction flow rate to or from the command flow rate. This configuration enables the command flow rate to be appropriately corrected.

Note that the power steering unit according to the embodiment has the load detecting device that detects the load applied to the oil pump unit. Therefore, the flow correcting device may correct the command flow rate of oil set by the flow setting device in accordance with the load applied to the oil pump unit, which is detected by the load detecting device. Accordingly, the power steering unit according to embodiment can deal with changes in the flow rate of the oil discharged from the oil pump unit in accordance with the load applied to the oil pump unit. The load detecting device which detects the load applied to the oil pump unit may directly detect the load using the sensor such as the pressure sensor or the like, or may estimate the load using the vehicle quantity of state, such as the vehicle speed, the steering angle or a degree of grip.

The hydraulic power steering unit according to the embodiment is configured such that, when the steering device performs steering, the assist force generating unit generates assist force using the oil supplied from the oil pump unit, as described above, so as to assist steering.

In order to generate the above described assist force, the command flow setting device sets the command flow rate of the oil supplied from the oil pump unit to the assist force generating unit in accordance with the vehicle quantity of state. The vehicle quantity of state may be any one of various quantities of state such as, for example, vehicle speed-related parameters, e.g. the vehicle speed, or steering angle-related parameters, e.g. the steering angle. For example, the vehicle quantity of state may be the engine speed or the crankshaft speed when the vehicle is equipped with an engine as the drive source for running the vehicle, or may be the motor speed or the like when the vehicle is equipped with the motor as the drive source for running the vehicle.

The flow correcting device corrects the command flow rate of the oil set by the command flow setting device in accordance with the speed of the oil pump unit. As a result, even when the pump speed of the oil pump unit changes when the steering conditions of the vehicle are the same, change in the flow rate of the oil supplied from the oil pump unit to the assist force generating unit can be reduced. Consequently, even when the speed of the oil pump unit changes, change in the assist force before and after the change in the pump speed is reduced, which is advantageous for reducing difference in steering feel that the driver or other vehicle users can sense.

In the hydraulic power steering unit according to the embodiment, even when the speed of the oil pump unit changes, change in the flow rate of the oil supplied from the oil pump unit to the assist force generating unit can be reduced. As a result, change in the assist force generated by the assist force generating unit is reduced, which is advantageous for reducing differences in steering feel that the driver or other vehicle users can sense.

The embodiment described herein is to be regarded as illustrative rather than restrictive. Plural objectives are achieved by the present invention, and yet there is usefulness in the present invention as far as one of the objectives are achieved. Variations and changes may be made by others, and equivalents employed, without departing from spirit of the present invention. Accordingly, it is expressly intended that all variations. Changes and equivalents which fall within the spirit and scope of the present invention as defined in the claims, be embraced thereby.

What is claimed is:

1. A hydraulic power steering unit comprising:
    an assist force generating unit that uses oil to generate assist force for steering by a steering device;
    an oil pump unit that supplies oil to the assist force generating unit;
    a load detecting device that detects load applied to the oil pump unit;
    a controller that controls the oil pump unit, wherein the controller includes a command flow setting device that sets a command flow rate of oil supplied from the oil pump unit to the assist force generating unit in accordance with a vehicle quantity of state that includes at least one of a vehicle speed and a steering angle, and a flow correcting device that corrects the command flow rate of oil set by the command flow setting device to provide at least two correction flow rates, by determining each correction flow rate in accordance with both a speed of the oil pump unit and the load applied to the oil pump unit, and selectively adding and subtracting the respective correction flow rate to and from the command flow rate.

2. The hydraulic power steering unit according to claim 1, wherein the flow correcting device includes a calculating unit that selectively adds and subtracts a correction flow rate to and from the command flow rate.

3. The hydraulic power steering unit according to claim 1, wherein the flow correcting device includes a pump speed detecting device that detects the speed of the oil pump, and corrects the command flow rate in accordance with the speed of the oil pump detected by the pump speed detecting device.

4. The hydraulic power steering unit according to claim 1, wherein the assist force generating unit includes a hollow chamber and a moveable body that divides the hollow chamber into a first chamber and a second chamber, and generates assist force using differential pressure between the first chamber and the second chamber.

5. The hydraulic power steering unit according to claim 1, wherein the flow correcting device comprises a plurality of maps, each of said maps providing a relationship between the speed of the oil pump unit and the correction flow rate.

6. A hydraulic power steering unit comprising:
   an assist force generating unit that uses oil to generate assist force for steering by a steering device;
   an oil pump unit that supplies oil to the assist force generating unit;
   a load detecting device that detects load applied to the oil pump unit;
   a controller that controls the oil pump unit, wherein the controller includes command flow setting means for setting a command flow rate of oil supplied from the oil pump unit to the assist force generating unit in accordance with a vehicle quantity of state that includes at least one of a vehicle speed and a steering angle, and flow correcting means for correcting the command flow rate of oil set by the command flow setting means to provide at least two correction flow rates, by determining each correction flow rate in accordance with both a speed of the oil pump unit and the load applied to the oil pump unit, and selectively adding and subtracting the respective correction flow rate to and from the command flow rate.

7. The hydraulic power steering unit according to claim 6, wherein the flow correcting means comprises a plurality of maps, each of said maps providing a relationship between the speed of the oil pump unit and the correction flow rate.

* * * * *